United States Patent
Mangalampalli et al.

(10) Patent No.: US 10,185,680 B2
(45) Date of Patent: *Jan. 22, 2019

(54) SECURE DIRECT MEMORY ACCESS

(71) Applicant: Intel Corporation, Santa Clara, CA (US)

(72) Inventors: Jayant Mangalampalli, Secunderabad (IN); Venkat R. Gokulrangan, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/784,743

(22) Filed: Oct. 16, 2017

(65) Prior Publication Data

US 2018/0101488 A1    Apr. 12, 2018

Related U.S. Application Data

(63) Continuation of application No. 15/089,287, filed on Apr. 1, 2016, now Pat. No. 9,792,234, which is a continuation of application No. 13/976,951, filed as application No. PCT/US2011/066592 on Dec. 21, 2011, now Pat. No. 9,311,458.

(51) Int. Cl.

| | |
|---|---|
| *G06F 21/10* | (2013.01) |
| *G11B 20/00* | (2006.01) |
| *G06F 21/60* | (2013.01) |
| *G06F 13/28* | (2006.01) |
| *G06F 12/14* | (2006.01) |

(52) U.S. Cl.
CPC .......... *G06F 13/28* (2013.01); *G06F 12/1408* (2013.01); *G06F 12/1441* (2013.01); *G06F 21/10* (2013.01); *G06F 21/60* (2013.01); *G06F 21/602* (2013.01); *G11B 20/0013* (2013.01); *G11B 20/0021* (2013.01); *G11B 20/00086* (2013.01); *G06F 2212/1052* (2013.01)

(58) Field of Classification Search
None
See application file for complete search history.

(56) References Cited

U.S. PATENT DOCUMENTS 5,659,798 A * 8/1997 Blumrich ................ G06F 13/28
710/22
5,825,878 A * 10/1998 Takahashi ............... G06F 21/79
713/190
5,892,900 A * 4/1999 Ginter .................... G06F 21/10
726/26

(Continued)

FOREIGN PATENT DOCUMENTS

EP    1376302 A2 * 1/2004    ............ G06F 21/10

OTHER PUBLICATIONS

'Diagnostic Address Compare for Unauthorized Access to Shared Memory'—IPCOM000100801D, IBM, Mar. 16, 2005.*

*Primary Examiner* — Steven G Snyder

(57) ABSTRACT

Examples are disclosed for establishing a secure destination address range responsive to initiation of a direct memory access (DMA) operation. The examples also include allowing decrypted content obtained as encrypted content from a source memory to be placed at a destination memory based on whether destination memory addresses for the destination memory fall within the secure destination address range.

24 Claims, 6 Drawing Sheets

(56) References Cited

U.S. PATENT DOCUMENTS

| | | | | |
|---|---|---|---|---|
| 5,960,458 A * | 9/1999 | Kametani | G06F 15/17 | 711/147 |
| 6,105,080 A * | 8/2000 | Holt | G06F 13/28 | 710/26 |
| 6,161,168 A * | 12/2000 | Kametani | G06F 15/167 | 711/147 |
| 6,202,106 B1 * | 3/2001 | Baxter | G06F 3/14 | 710/22 |
| 6,629,152 B2 * | 9/2003 | Kingsbury | G06F 9/544 | 719/313 |
| 6,775,750 B2 * | 8/2004 | Krueger | G06F 12/109 | 711/152 |
| 6,986,052 B1 * | 1/2006 | Mittal | G06F 12/1441 | 711/E12.097 |
| 7,194,766 B2 * | 3/2007 | Noehring | H04L 29/06 | 713/153 |
| 7,523,229 B2 * | 4/2009 | Hatakeyama | G06F 13/28 | 710/22 |
| 7,568,055 B2 * | 7/2009 | Nakai | G06F 21/608 | 709/212 |
| 7,681,044 B2 * | 3/2010 | Goto | G06F 12/1491 | 713/190 |
| 7,716,746 B2 * | 5/2010 | Hori | G06F 21/10 | 705/59 |
| 7,734,926 B2 * | 6/2010 | Morais | G06F 12/1408 | 713/181 |
| 7,779,254 B1 * | 8/2010 | Crosmer | G06F 21/85 | 710/22 |
| 7,941,860 B2 * | 5/2011 | Poisner | G06F 21/126 | 713/165 |
| 7,949,835 B2 * | 5/2011 | Kershaw | G06F 12/1081 | 711/147 |
| 8,001,390 B2 * | 8/2011 | Hatakeyama | G06F 21/74 | 709/212 |
| 8,108,641 B2 * | 1/2012 | Goss | G06F 12/1408 | 711/163 |
| 8,265,274 B2 * | 9/2012 | Kurauchi | G06F 12/1416 | 370/431 |
| 8,332,653 B2 * | 12/2012 | Buer | G06F 21/575 | 380/277 |
| 8,418,256 B2 * | 4/2013 | Futa | G06F 12/0246 | 711/163 |
| 8,464,069 B2 * | 6/2013 | Case | G06F 12/1458 | 713/189 |
| 8,478,959 B1 * | 7/2013 | Wyatt | G06F 12/1475 | 711/163 |
| 8,521,920 B2 * | 8/2013 | Nito | G06F 12/145 | 710/22 |
| 8,615,614 B2 * | 12/2013 | Xu | G06F 13/28 | 710/26 |
| 8,706,923 B2 * | 4/2014 | Sankaran | G06F 13/28 | 710/22 |
| 8,707,054 B2 * | 4/2014 | De Perthuis | H04L 9/0637 | 713/190 |
| 8,812,804 B2 * | 8/2014 | Goss | G06F 12/1408 | 711/163 |
| 8,819,399 B1 * | 8/2014 | Muth | G06F 21/53 | 712/220 |
| 9,003,077 B2 * | 4/2015 | Ye | G06F 13/28 | 710/26 |
| 9,268,594 B2 * | 2/2016 | Shanbhogue | G06F 9/4812 | |
| 9,432,196 B2 * | 8/2016 | Goss | G06F 12/1408 | |
| 9,438,424 B2 * | 9/2016 | Goss | G06F 12/1408 | |
| 9,442,865 B2 * | 9/2016 | Shanbhogue | G06F 9/4812 | |
| 9,667,425 B2 * | 5/2017 | Goss | G06F 12/1408 | |
| 9,785,576 B2 * | 10/2017 | Loh | G06F 12/1408 | |
| 2003/0018860 A1 * | 1/2003 | Krueger | G06F 12/109 | 711/152 |
| 2003/0093625 A1 * | 5/2003 | Beukema | G06F 12/1081 | 711/147 |
| 2003/0131250 A1 * | 7/2003 | Quere | G06F 21/72 | 713/189 |
| 2004/0003262 A1 * | 1/2004 | England | G06F 21/606 | 713/189 |
| 2004/0107264 A1 * | 6/2004 | Nishida | G06F 13/1663 | 709/213 |
| 2005/0033979 A1 * | 2/2005 | Hyser | G06F 12/145 | 726/4 |
| 2005/0165783 A1 * | 7/2005 | Hyser | G06F 9/468 | |
| 2006/0004946 A1 * | 1/2006 | Shah | G06F 13/28 | 711/100 |
| 2006/0015749 A1 * | 1/2006 | Mittal | G06F 12/1441 | 713/190 |
| 2006/0075158 A1 * | 4/2006 | Hatakeyama | G06F 13/28 | 710/22 |
| 2006/0090084 A1 * | 4/2006 | Buer | G06F 21/53 | 713/189 |
| 2007/0294496 A1 * | 12/2007 | Goss | G06F 12/1408 | 711/163 |
| 2008/0126612 A1 * | 5/2008 | Barrow | G06F 13/28 | 710/34 |
| 2008/0282093 A1 * | 11/2008 | Hatakeyama | G06F 12/1416 | 713/190 |
| 2009/0080649 A1 * | 3/2009 | Dellow | H04L 9/0637 | 380/44 |
| 2009/0132776 A1 * | 5/2009 | Kurauchi | G06F 12/1416 | 711/163 |
| 2009/0259857 A1 * | 10/2009 | Gehrmann | G06F 21/10 | 713/193 |
| 2010/0293423 A1 * | 11/2010 | Goyal | G01R 31/3177 | 714/726 |
| 2011/0029961 A1 * | 2/2011 | Muth | G06F 21/52 | 717/154 |
| 2011/0055435 A1 * | 3/2011 | Nito | G06F 12/1081 | 710/22 |
| 2011/0078760 A1 * | 3/2011 | De Perthuis | G06F 21/6218 | 726/1 |
| 2012/0023337 A1 * | 1/2012 | De Perthuis | G06F 12/1466 | 713/190 |
| 2012/0066415 A1 * | 3/2012 | Sankaran | G06F 13/28 | 710/23 |
| 2012/0072619 A1 * | 3/2012 | Tsirkin | G06F 9/45558 | 710/26 |
| 2012/0147937 A1 * | 6/2012 | Goss | G06F 12/1408 | 375/222 |
| 2013/0086285 A1 * | 4/2013 | Ye | G06F 13/28 | 710/26 |
| 2013/0138841 A1 * | 5/2013 | Xu | G06F 13/28 | 710/26 |
| 2013/0159726 A1 * | 6/2013 | McKeen | G06F 21/72 | 713/189 |
| 2013/0305342 A1 * | 11/2013 | Kottilingal | G06F 21/62 | 726/11 |
| 2014/0053001 A1 * | 2/2014 | Rodgers | H04N 19/423 | 713/193 |
| 2014/0201810 A1 * | 7/2014 | Odom | H04L 63/08 | 726/3 |
| 2015/0032946 A1 * | 1/2015 | Goss | G06F 12/1408 | 711/103 |
| 2015/0032951 A1 * | 1/2015 | Goss | G06F 12/1408 | 711/105 |
| 2015/0033038 A1 * | 1/2015 | Goss | G06F 12/1408 | 713/193 |
| 2016/0232105 A1 * | 8/2016 | Goss | G06F 21/575 | |
| 2016/0232108 A1 * | 8/2016 | Goss | G06F 12/1408 | |
| 2016/0234019 A1 * | 8/2016 | Goss | G06F 12/1408 | |
| 2017/0076102 A1 * | 3/2017 | Ishihara | G06F 12/1408 | |

\* cited by examiner

SECURE DIRECT MEMORY ACCESS

CROSS-REFERENCE TO RELATED APPLICATIONS

This application is a continuation of, claims the benefit of and priority to previously filed U.S. patent application Ser. No. 15/089,287 filed Apr. 1, 2016, which is a continuation of U.S. patent application Ser. No. 13/976,951 filed Jun. 27, 2013 and issued as U.S. Pat. No. 9,311,458 on Apr. 12, 2016, which is a national phase entry of PCT/US2011/066592, filed Dec. 21, 2011; the subject matter of all of the above are incorporated herein by reference in their entirety.

BACKGROUND

More and more computing devices are being used to view and/or listen to streaming video or audio content that may be copyright protected. Also, as video/audio content of increasing resolutions is streamed, computing devices may need to at temporarily store protected content. Owners of copyright protected content may place requirements on computing devices to ensure the content is not pirated or freely copied when it is streamed to the computing devices. These requirements may include configuring the computing devices to execute protected playback. Typically, protected playback includes decrypting protected content and placing the decrypted content into a secure memory for eventual output to a user of the computing device. However, while in the secure memory, the decrypted content is not accessible to host applications (e.g., an operating system) for the computing device.

DETAILED DESCRIPTION

As contemplated in the present disclosure, protected playback includes decrypting protected content and placing the decrypted content into a secure memory. In some examples, secure processor (SEP) subsystems may provide for secure direct memory access (DMA) operations. Secure DMA operations may be referred to as "crypto-DMA operations". Current crypto-DMA operations include obtaining encrypted content from a source memory and placing the decrypted content in a secure destination memory. For these current crypto-DMA operations, a host or operating system for a computing device typically has control over what destination addresses the decrypted content is to be placed. But host or operating systems may be hijacked by malicious applications or code. Thus, a malicious application may hijack an operating system and redirect the decrypted content to destination address for an unsecure destination memory. The malicious application or possibly any application may then freely copy the decrypted content.

In some examples, techniques are implemented for secure DMA operations. For these examples, a secure destination address range may be established in response to initiation of a DMA operation. The DMA operation may include obtaining encrypted content maintained at a source memory, decrypting the encrypted content, and placing the decrypted content at a secure destination memory. Once a secure destination address range has been established, a destination DMA table may be received that includes one or more destination addresses associated with the secure destination memory. Allowance of the decrypted content to be placed at the secure destination memory may be based on the one or more destination addresses falling within the secure destination address range.

Figure 1:
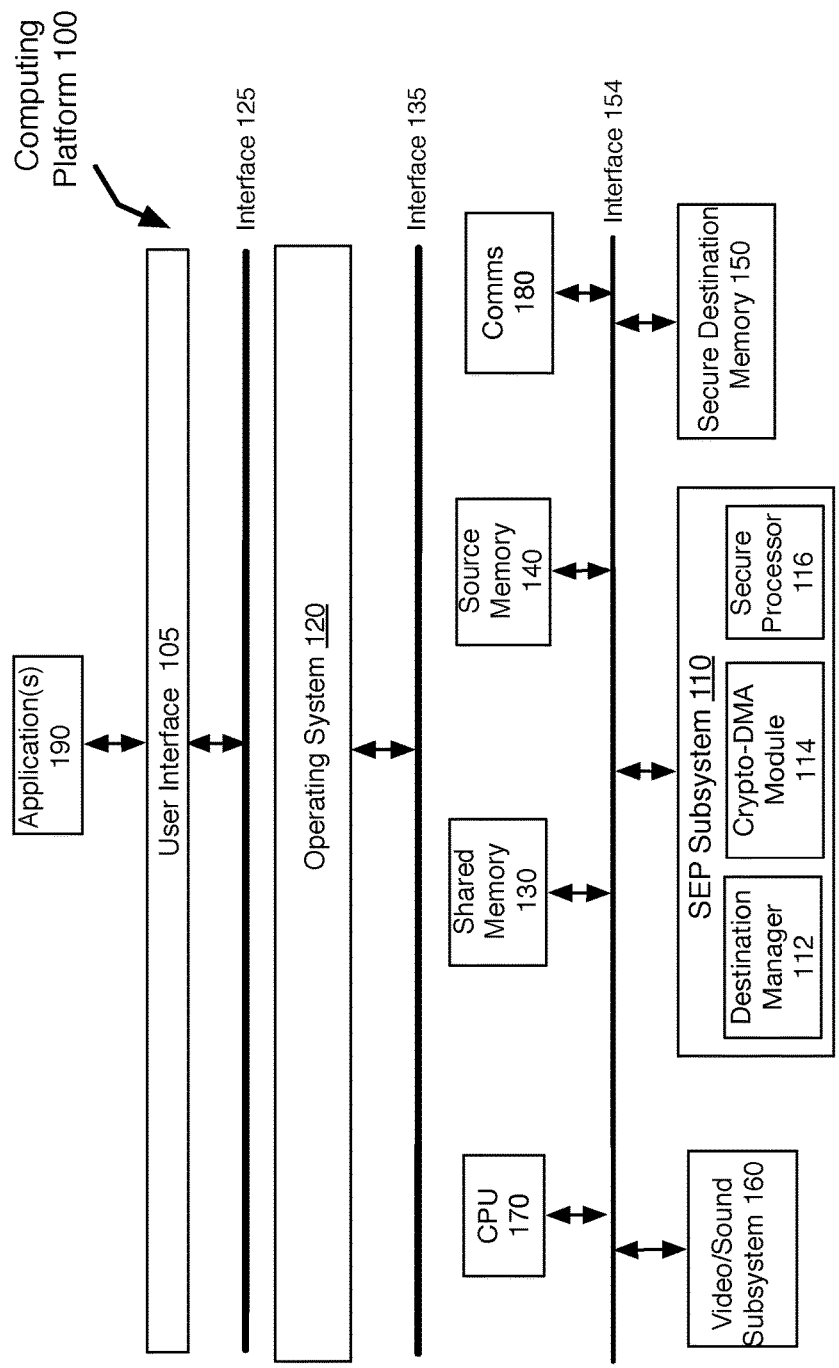
FIG. 1 illustrates an example computing platform.

FIG. 1 illustrates an example computing platform 100. As shown in FIG. 1, computing platform 100 includes a secure processing (SEP) subsystem 110, an operating system 120, a source memory 130, a shared memory 140, a secure destination memory 150, a video/sound subsystem 160, a central processing unit (CPU) 170, communications (comms) 180, and application(s) 190. Also, as shown in FIG. 1, several interfaces may interconnect and/or communicatively couple elements of computing platform 100. For example, a user interface 115 and an interface 125 may allow for users (not shown) and/or application(s) 190 to couple to operating system 120. Also, interface 135 may allow for operating system 120 to have at least limited access to elements of computing platform 100 such as SEP subsystem 110, shared memory 130, source memory 140, secure destination memory 150, video/sound subsystem 160 or comms 180. Interface 154, may allow hardware and/or firmware elements of computing platform 100 to communicatively couple together, e.g., via a system bus or other type of internal communication channel.

In some examples, as shown in FIG. 1, SEP subsystem 110 may include a destination manager 112, a crypto-DMA module 114 and a secure processor 116. Destination manager 112, crypto-DMA module 114 and secure processor 116 may include logic and/or features configured to perform crypto-DMA operations. The crypto-DMA operations may include obtaining encrypted content maintained at a source memory (e.g., source memory 140), decrypting the encrypted content and placing the decrypted content at a secure destination memory (e.g., secure destination memory 150).

According to some examples, operating system 120 may cooperate with SEP subsystem 110 to allow for protected playback of content that application(s) 190 may have requested. For these examples, a user of applications(s) 190 may want to watch a streaming video (e.g., via a network resource or media server) on a display attached or coupled to computing platform 100. Operating system 120, for example, may allow application(s) 190 to utilize comms 180 to stream protected content to source memory 140. As described more below, operating system 120 and/or application(s) 190 may initiate crypto-DMA operations to be implemented by elements of SEP subsystem 110 to allow for protected playback of the encrypted content stream.

According to some examples, shared memory 130 may be include a wide variety of memory media utilized by various elements of computing platform 100 (e.g., operating system 120, SEP subsystem 110, application(s) 190, etc.). For these implementations, shared memory 130 may include, but is not limited to, one or more of volatile memory, non-volatile memory, flash memory, random access memory (RAM), dynamic random access memory (DRAM) or static RAM (SRAM).

In some examples, source memory 140 and secure destination memory 150 may also include a wide variety of memory media including, but not limited to, one or more of volatile memory, non-volatile memory, flash memory, RAM, ROM, or other static or dynamic storage media.

According to some examples, video/sound subsystem 160 may include elements of computing platform 100 to provide video/sound output to a user of a computing device including computing platform 100. These elements may include audio/video controllers, graphics processors, etc. In some examples, video/sound subsystem 160 may be directed by operating system 120 to obtain video/sound content from one or more memory addresses associated with secure destination memory 150.

According to some examples, CPU 170 may be implemented as a central processing unit for computing platform 100. CPU 170 may include one or more processing units having one or more processor cores or having any number of processors having any number of processor cores. CPU 170 may include any type of processing unit, such as, for example, a multi-processing unit, a reduced instruction set computer (RISC), a processor having a pipeline, a complex instruction set computer (CISC), digital signal processor (DSP), and so forth.

In some examples, comms 180 may include logic and/or features to enable computing platform 100 to communicate externally with elements remote to computing platform 100 (e.g., to request and receive streaming protected content). These logic and/or features may include communicating over wired and/or wireless communication channels via one or more wired or wireless networks. In communicating across such networks, comms 180 may operate in accordance with one or more applicable communication or networking standards in any version.

As mentioned above, interface 154 may allow hardware and/or firmware elements of computing platform 100 to communicatively couple together. According to some examples, communication channels interface 154 may operate in accordance with one or more protocols or standards. These protocols or standards may be described in one or one or more industry standards (including progenies and variants) such as those associated with the Inter-Integrated Circuit ($I^2C$) specification, the System Management Bus (SMBus) specification, the Accelerated Graphics Port (AGP) specification, the Peripheral Component Interconnect Express (PCI Express) specification, the Universal Serial Bus (USB), specification or the Serial Advanced Technology Attachment (SATA) specification. Although this disclosure is not limited to only the above-mentioned standards and associated protocols.

In some examples, computing platform 100 may be at least part of a computing device. Examples of a computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Figure 2:
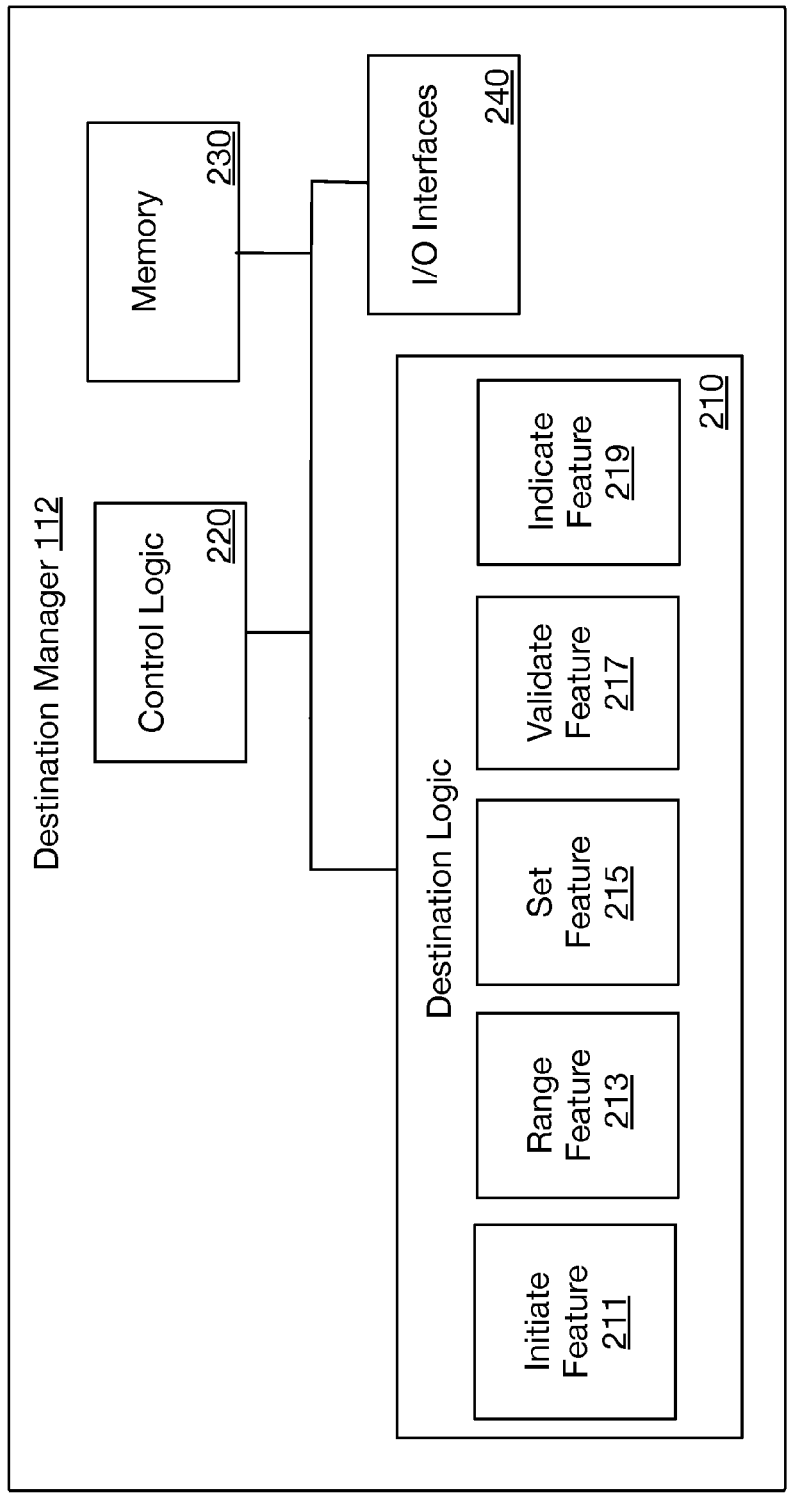
FIG. 2 illustrates a block diagram of an example architecture for a destination manager.

FIG. 2 illustrates a block diagram of an example architecture for destination manager 112. As described above for computing platform 100 in FIG. 1, SEP subsystem 110 may include destination manager 112. In some examples, destination manager 112 includes features and/or logic configured or arranged to facilitate secure DMA operations.

The example destination manager 112 of FIG. 2, includes destination logic 210, control logic 220, a memory 230 and input/output (I/O) interfaces 240. As illustrated in FIG. 2, destination logic 210 may be coupled to control logic 220, memory 230 and I/O interfaces 240. Destination logic 210 may include one or more of an initiate feature 211, a range feature 213, a set feature 215, a validate feature 217, or an indicate feature 219, or any reasonable combination thereof.

In some examples, the elements portrayed in FIG. 2 are configured to support or enable destination manager 112 as described in this disclosure. A given destination manager 112 may include some, all or more elements than those depicted in FIG. 2. For example, destination logic 210 and control logic 220 may separately or collectively represent a wide variety of logic device(s) or executable content to implement the features of destination manager 112. Example logic devices may include one or more of a microprocessor, a microcontroller, a processor circuit, a secure processor, a field programmable gate array (FPGA), an application specific integrated circuit (ASIC), a sequestered thread or a core of a multi-core/multi-threaded microprocessor or a combination thereof.

In some examples, as shown in FIG. 2, destination logic 210 includes initiate feature 211, range feature 213, set feature 215, validate feature 217, or indicate feature 219. Destination logic 210 may be configured to use one or more of these features to perform operations. For example, initiate feature 211 may respond to initiation of a request by an operating system or application to begin a crypto-DMA operation. Range feature 213 may establish a secure destination address range for placement of decrypted content in a secure destination memory. Set feature 215 may set source and destination registers at a crypto-DMA module to assist in the movement of protected content from the source memory to the secure destination memory. Validate feature 217 may determine whether destination addresses associated with the secure destination memory fall within the secure destination address range. Indicate feature 219 may send error indications to the operating system or application if the crypto-DMA operation is halted due to one or more destination addresses falling outside of the secure destination address range.

In some examples, control logic 220 may be configured to control the overall operation of destination manager 112. As mentioned above, control logic 220 may represent any of a wide variety of logic device(s) or executable content. For some examples, control logic 220 may be configured to operate in conjunction with executable content or instructions to implement the control of destination manager 112. In some alternate examples, the features and functionality of control logic 220 may be implemented within destination logic 210.

According to some examples, memory 230 may be arranged to store executable content or instructions for use by control logic 220 and/or destination logic 210. The executable content or instructions may be used to implement or activate features or elements of destination manager 112. As described more below, memory 230 may also be arranged to at least temporarily maintain information associated with establishing secure destination address ranges and setting source and destination registers at a DMA module such a crypto-DMA module 114. Memory 230 may also be arranged to temporarily store information associated with validating destination addresses associated with a secure destination memory.

Memory 230 may include a wide variety of memory media including, but not limited to, one or more of volatile memory, non-volatile memory, flash memory, programmable variables or states, RAM, ROM, or other static or dynamic storage media.

In some examples, I/O interfaces 240 may provide an interface via a local communication medium or link between destination manager 112 and elements of computing platform 100 depicted in FIG. 1. I/O interfaces 240 may include interfaces that operate according to various communication protocols to communicate over the local communication medium or link (e.g., I²C, SMBus, AGP, PCI Express, USB, SATA, etc).

Figure 3:
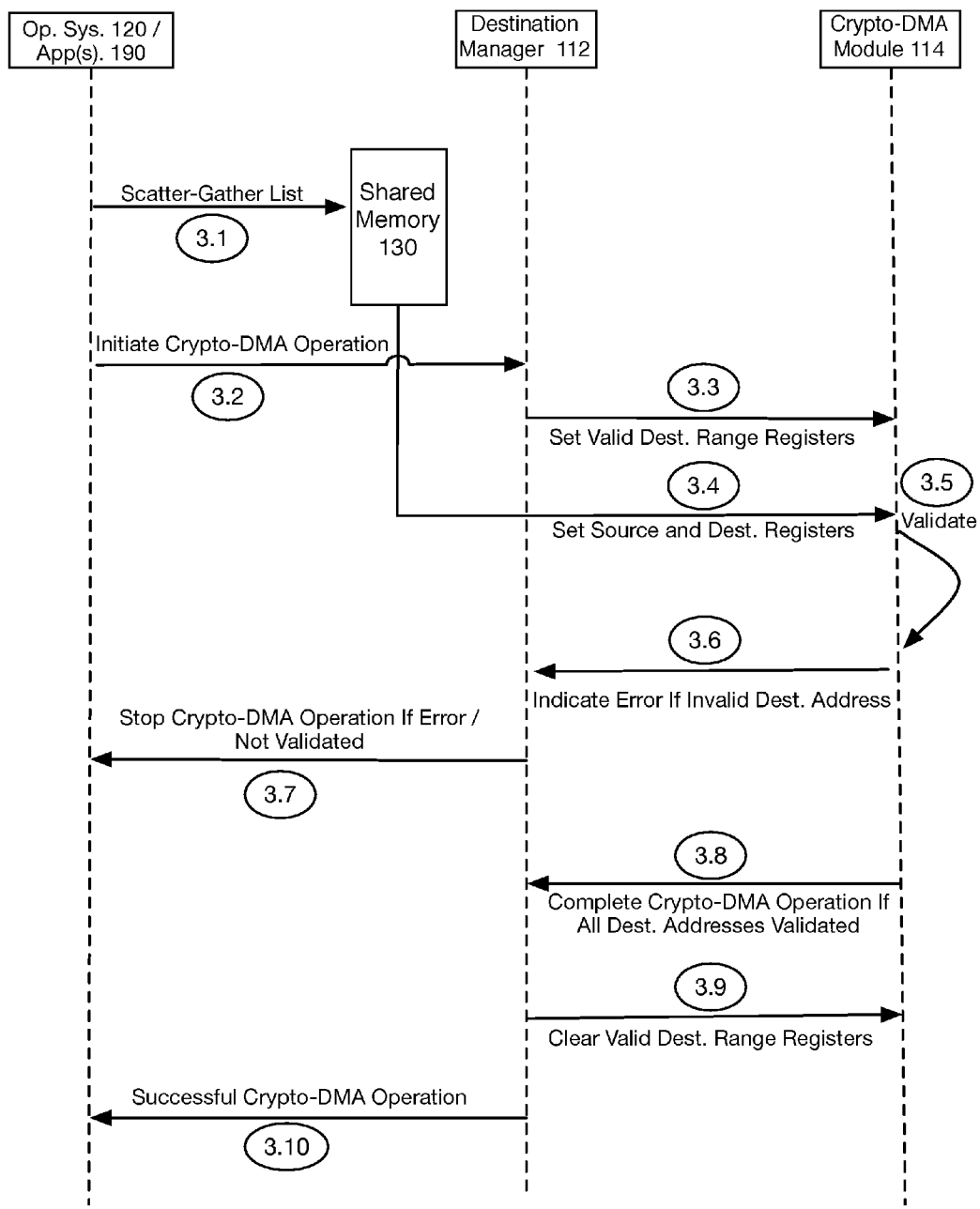
FIG. 3 illustrates an example process diagram for a secure DMA operation.

FIG. 3 illustrates an example process 300 for a secure DMA operation. In some examples, destination manager 112 as shown in FIG. 1 or described in FIG. 2 may include logic and/or features to facilitate process 300. Also, crypto-DMA module 114, secure processor 116, operating system 120, shared memory 130, source memory 140, secure destination memory 150 or application(s) 190 as shown in FIG. 1 may also be configured to implement at least some operations of process 300. Examples are not limited to just the above-mentioned elements for implementing process 300.

Starting at example process 3.1 (Scatter-Gather List), operating system 120 and/or application(s) 190 may be configured to generate or construct a scatter-gather list. In some examples, the scatter-gather list may indicate source and destination addresses for encrypted and decrypted content, respectively. For these examples, a user of application(s) 190 may want to watch a streaming video on a display coupled to computing platform 100. Operating system 120, for example may allow application(s) 190 to direct encrypted content to source memory 140. Operating system 120 and/or application(s) 190 may then generate a list of source addresses in source memory 140 to indicate where the encrypted content is being maintained. Operating system 120 and/or application(s) 190 may also generate a list of destination address associated with secure destination memory 150 to indicate where the decrypted content is to be placed. The source or destination list may be called a scatter-gather list to reflect the possibility that the encrypted/decrypted content may be obtained from non-contiguous portions of source memory 140 and/or secure destination memory 150. Also, for these examples, operating system 120 and/or application(s) 190 may at least temporarily place the scatter-gather list in shared memory 130.

Continuing to example process 3.2 (Initiate Crypto-DMA Operation), operating system 120 and/or application(s) 190 may initiate a crypto-DMA operation. In some examples, destination manager 112 at SEP subsystem 110 may include logic and/or features to respond to the initiation (e.g., via initiate feature 211) to begin the crypto-DMA operation. For these examples, the presence of the scatter-gather list in shared memory 130 may indicate operating system 120's and/or application(s) 190's intent to initiate the crypto-DMA operation.

Continuing to example process 3.3 (Set Valid Dest. Range Registers), destination manager 112 may include logic and/or features to set valid destination range registers maintained at crypto-DMA module 114 (e.g., via range feature 213) in response to the initiation of the crypto-DMA operation. In some examples, the valid destination range registers maintained at crypto-DMA module 114 may be set to establish a secure destination address range via which decrypted content may be placed at secure destination memory 150. For these examples, destination manager 112 may set a valid destination start address register and a valid destination end register maintained at crypto-DMA module 114. A destination address falling at or between the start and the end addresses indicated by these registers, for example, falls within the secure destination address range and may be considered as a "valid destination address".

Continuing to example process 3.4 (Set Source and Dest. Registers), destination manager 112 may include logic and/or features to receive the scatter-gather list from shared memory 130 and begin to set source and destination address registers (e.g., via set feature 215) maintained at crypto-DMA module 114 based on the scatter-gather list. In some examples, as mentioned above, the scatter-gather list includes source addresses associated with encrypted content maintained at source memory 140 and also includes destination addresses to place decrypted content at secure destination memory 150.

Continuing to example process 3.5 (Validate), crypto-DMA module 114 may be configured to automatically validate destination addresses included in the scatter-gather list. In some examples, crypto-DMA module 114 may separately validate individual destination addresses as destination manager 112 attempts to set each destination address register. For example, crypto-DMA module 114 may be configured to automatically confirm whether each destination address falls within the secure destination address range.

Moving to example process 3.6 (Indicate Error if Invalid Dest. Address), crypto-DMA module 114 may be configured to determine that a given destination address does not fall within the secure destination address range. In some examples, crypto-DMA module 114 may determine that the given destination address is invalid and crypto-DMA module 114 may halt the register setting process and send an error signal to destination manager 112.

Continuing to example process 3.7 (Stop Crypto-DMA Operation If Error/Not Validated), destination manager 112 may include logic and/or features configured to stop the crypto-DMA operation (e.g., via validate feature 217). In some examples, upon stopping the crypto-DMA operation, destination manager 112 may send an error message or indication to operating system 120 and/or application(s) 190. For these examples, the error message may indicate that an invalid destination address was included in the scatter-gather list.

Moving to example process 3.8 (Complete Crypto-DMA Operation If All Dest. Addresses Validated), crypto-DMA module 114 may then begin the movement of the encrypted content from source memory 140 based on the source address registers set as described above. In some examples, the encrypted content obtained from source memory 140 may be decrypted by secure processor 116 and then placed by crypto-DMA module 114 in secured destination memory 150 based on the destination address registers also set and validated as described above.

Continuing to example process 3.9 (Clear Valid Dest. Range Registers), destination manager 112 may clear the valid destination range registers set at crypto-DMA module 114 as mentioned above. In some examples, the valid destination range registers may be cleared based on completion of the crypto-DMA operation. In some other examples, the valid destination range registers may also be cleared if, following an error message (e.g., invalid destination address), operating system 120 and/or application 190 abandons efforts to conduct the crypto-DMA operation. For these examples, destination manager 112 may assume operating system 120 and/or application 190 has abandoned efforts to conduct the crypto-DMA operation if a new or modified scatter-gather list is not generated within a given period of time (e.g., a number of seconds or a few minutes).

Moving to example process 3.10 (Successful Crypto-DMA Operation), destination manager 112 may included logic and/or features to indicate a successful crypto-DMA operation (e.g., via indicate feature 219). In some examples, the successful crypto-DMA operation may include the movement of the protected content between source memory 140 and secure destination memory 150 according to the source/destination address indicated in scatter-gather list. For these examples, all destination addresses were determined to be within the secure destination address range and thus were validated before decrypted content was placed in secure destination memory 150.

Figure 4:
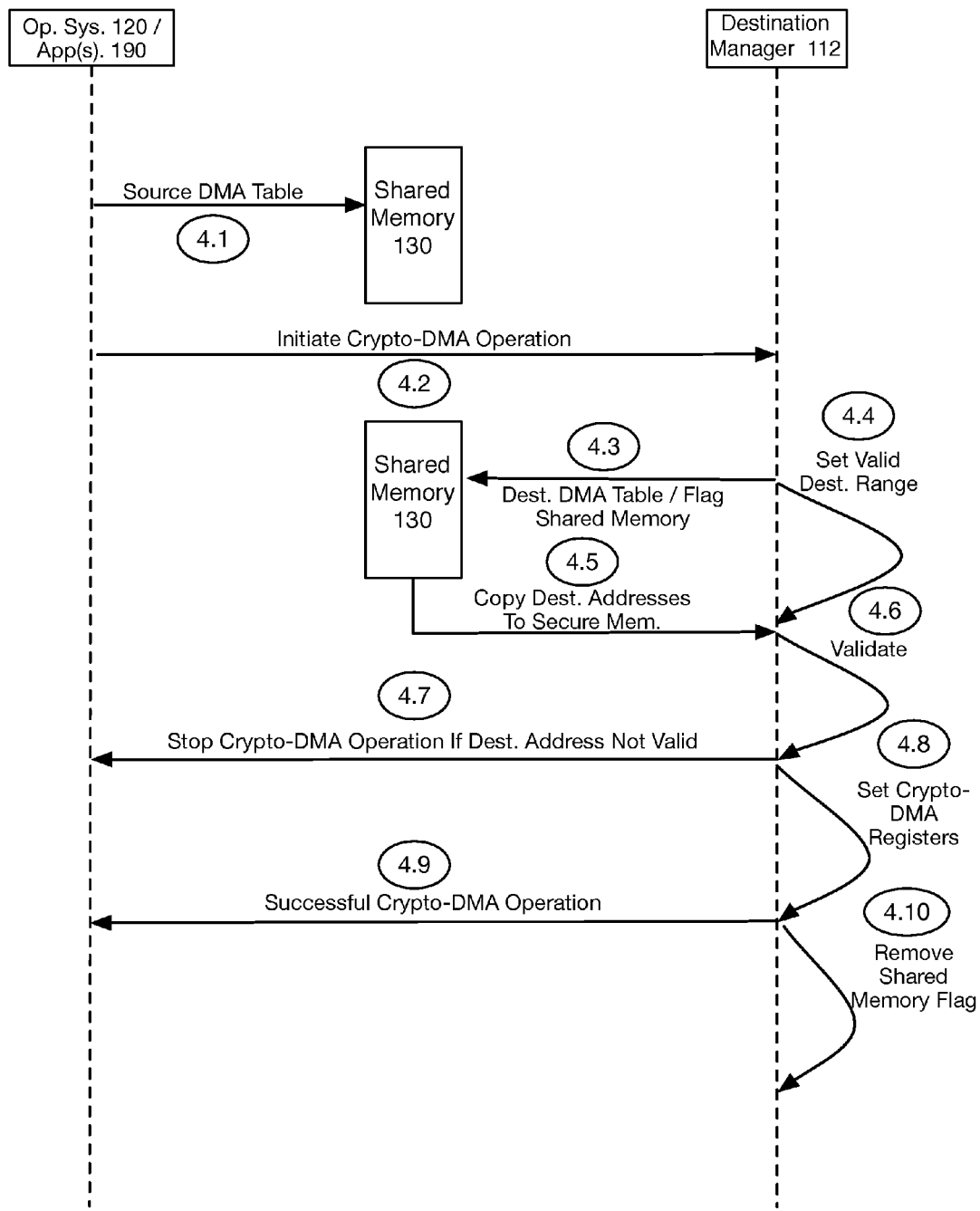
FIG. 4 illustrates an example process diagram for another secure DMA operation.

FIG. 4 illustrates an example process 400 for another secure DMA operation. In some examples, destination manager 112 as shown in FIG. 1 or described in FIG. 2 may include logic and/or features to facilitate process 400. Also, crypto-DMA module 114, secure processor 116, operating system 120, shared memory 130, source memory 140, secure destination memory 150 or application(s) 190 as shown in FIG. 1 may also be configured to implement at least some operations of process 400. Examples are not limited to just the above-mentioned elements for implementing process 400.

Starting at example process 4.1 (Source DMA Table), operating system 120 and/or application(s) 190 may be configured to generate or construct a source DMA table. In some examples, destination manager 112 may not have adequate memory resources to maintain source/destination addresses included in a scatter-gather list as described above for process 300. So for these examples, destination manager 112 may utilize shared memory 130 to maintain the source/destination addresses. Only a source DMA table indicating one or more source addresses for encrypted content is constructed by operating system 120 and/or application(s) 190 and placed in shared memory 130. In order to protect the destination addresses, destination manager 112 may generate or construct a destination DMA table as described below.

Continuing to example process 4.2 (Initiate Crypto-DMA Operation), operating system 120 and/or application(s) 190 may initiate a crypto-DMA operation. In some examples, destination manager 112 at SEP subsystem 110 may include logic and/or features to respond to the initiation (e.g., via initiate feature 211) to begin the crypto-DMA operation. For these examples, the presence of the source DMA table in shared memory 130 may indicate operating system 120's and/or application(s) 190's intent to initiate the crypto-DMA operation.

Continuing to example process 4.3 (Dest. DMA Table/Flag Shared Memory), destination manager 112 may include logic and/or features configured to construct a destination DMA table (e.g., via initiate feature 211) and place the destination DMA table in a portion of shared memory 130. Also, destination manager 112 may flag the portion of shared memory 130 to indicate the portion's association with the crypto-DMA operation. In some examples, flagging the portion of shared memory 130 may also indicate that these destination addresses have yet to be validated.

Continuing to example process 4.4 (Set Valid Dest. Range), destination manager 112 may include logic and/or features configured to set a valid destination start address and a valid destination end address (e.g., via range feature 213). In some examples, unlike in process 300, destination manager 112 does not set registers at crypto-DMA module 114 to establish a secure destination address range. Rather, for these examples, destination manager 112 may maintain the valid destination start and end addresses in its own, secure memory (e.g., memory 230).

Continuing to example process 4.5 (Copy Dest. Addresses To Secure Memory), destination manager 112 may copy destination addresses from the destination DMA table maintained in shared memory 130. In some examples, one or more destination addresses may be copied to destination manager 112's own, secure memory (e.g., memory 230).

Continuing to example process 4.6 (Validate), destination manager 112 may include logic and/or features to validate the destination addresses copied to its secure memory (e.g., via validate feature 217). As mentioned above, destination manager 112 flagged the portions of shared memory 130 to indicate the need for validation of the destination addresses. In some examples, the flag indicates to destination manager 112 to check the validity of the one or more copied destination addresses. For these examples, destination manager 112 may determine validity by confirming whether the one or more copied destination addresses fall within the secure destination address range.

Moving to example process 4.7 (Stop Crypto-DMA Operation If Dest. Address Not Valid), destination manager 112 may stop the crypto-DMA operation if at least one of the destination addresses copied from shared memory 130 does not fall within the secure destination address range. In some examples, the at least one of the destination addresses not falling within the secure destination address range may result in an invalid destination address. For these examples, destination manager 112 may include logic and/or features to send an error message (e.g., via indicate feature 219) to operating system 120 and/or application(s) 190 to indicate an invalid destination address.

Moving to example process 4.8 (Set Crypto-DMA Registers), destination manager 112 may program or set source and destination registers at crypto-DMA module 114. In some examples, destination manager 112 may set these registers following validation of a destination address. For these examples, source registers may be set according to the source DMA table maintained in shared memory 130 and destination registers may be set according to the destination addresses maintained in shared memory 130.

Moving to example process 4.9 (Successful Crypto-DMA Operation), destination manager 112 may indicate a successful crypto-DMA operation. In some examples, the successful crypto-DMA operation may include the movement of the protected content between source memory 140 and secure destination memory 150 according to the source/destination addresses indicated in source and destination DMA tables. For these examples, all destination addresses were determined to be within the secure destination address range and thus were validated before decrypted content was placed in secure destination memory 150.

Moving to example process 4.10 (Remove Shared Memory Flag), destination manager 112 may remove the flag from the portion of shared memory 130 that indicated the portion's association with the crypto-DMA operation. In some examples, removal of the flag may indicate that the portion of memory may be overwritten with new source or destination DMA tables in subsequent crypto-DMA operations. In some other examples, the shared memory flag may also be cleared if following an error message (e.g., invalid destination address), operating system 120 and/or application 190 abandons efforts to conduct the crypto-DMA operation. For these examples, destination manager 112 may assume operating system 120 and/or application 190 has abandoned efforts to conduct the crypto-DMA operation if a request to retry the crypto-DMA operation is not received within a given period of time (e.g., a number of seconds or a few minutes).

Figure 5:
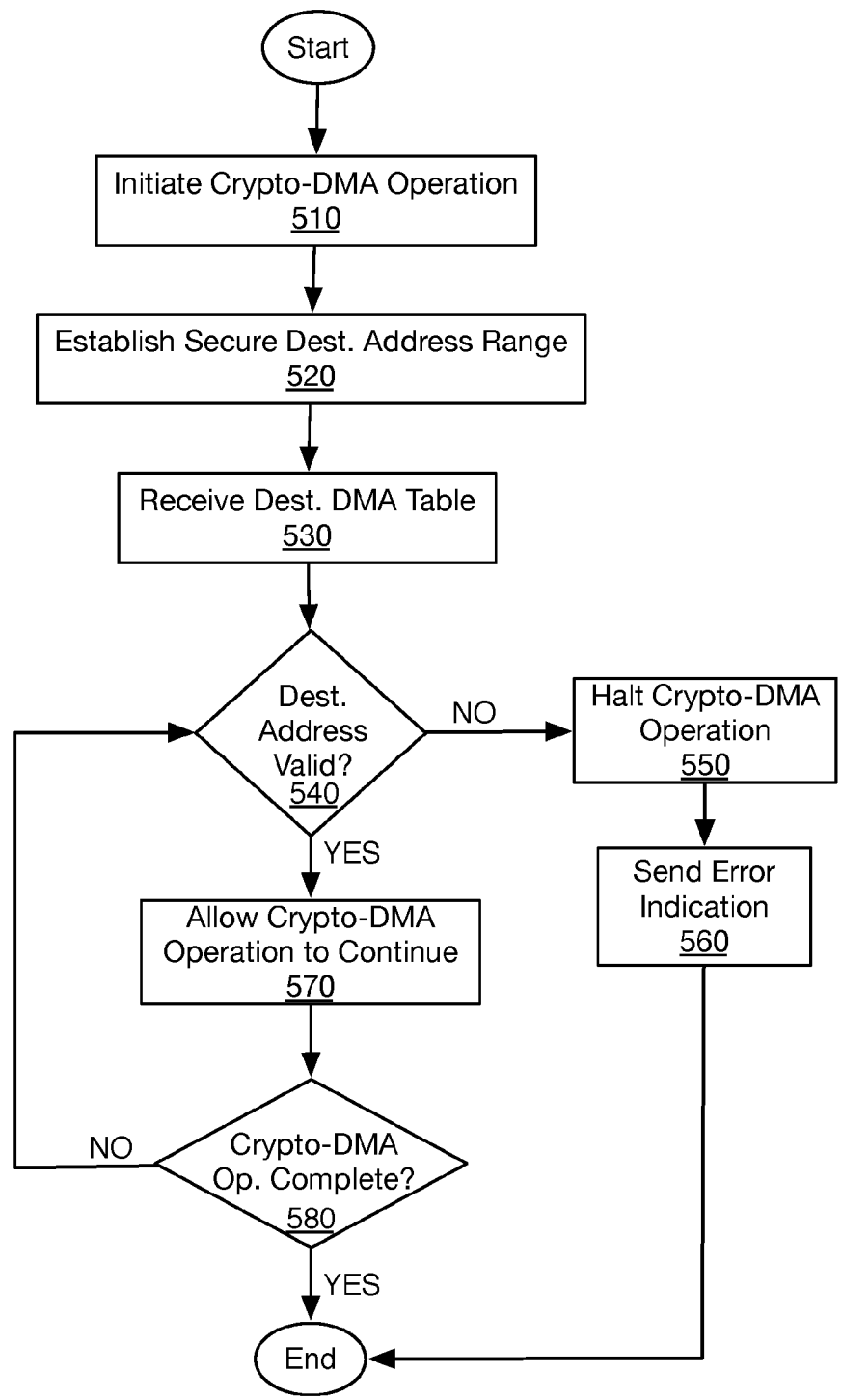
FIG. 5 illustrates a flow chart of example operations for a secure DMA operation.

FIG. 5 illustrates a flow chart of example operations for a secure DMA operation. In some examples, elements of computing platform 100 as shown in FIG. 1 may be used to illustrate example operations related to the flow chart depicted in FIG. 5. Destination manager 112 as shown in FIG. 1 and FIG. 2 may also be used to illustrate the example operations. But the described methods are not limited to implementations on computing platform 100 or to destination manager 112.

Moving from the start to block 510 (Initiate Crypto-DMA Operation), operating system 120 and/or application(s) 190 may initiate a crypto-DMA operation as described above for process 300 or process 400. In some examples, destination manager 112 at SEP subsystem 110 may include logic and/or features to respond to the initiation (e.g., via initiate feature 211) to begin the crypto-DMA operation.

Moving from block 510 to block 520 (Establish Secure Dest. Address Range), destination manager 112 may include logic and/or features configured to establish a secure destination address range (e.g., via range feature 213). In some examples, destination manager 112 may establish the secure destination address range by setting valid destination range registers maintained at crypto-DMA module 114. For these examples, similar to process 300, destination manager 112 may set a valid destination start address register and a valid destination end address register maintained at crypto-DMA module 114. In other examples, destination manager 112 may establish the secure destination without the setting of range registers. For these examples, similar to process 400, destination manager 112 may set a valid destination start address and a valid destination end address and maintain these addresses in its own, secure memory (e.g., memory 230).

Proceeding from block 520 to block 530 (Receive Dest. DMA Table), destination manager 112 may include logic and/or features configured to receive a destination DMA table (e.g., via validate feature 217). In some examples, destination manager 112 may receive the destination DMA table via a scatter-gather list generated by operating system 120 and/or application(s) 190. In other examples, the destination DMA table may be maintained in a flagged portion of shared memory 130. For these other examples, destination manager 112 may have generated the destination DMA table and flagged the portion of shared memory. The destination DMA table may then be received from this flagged portion of shared memory 130.

Proceeding from block 530 to decision block 540 (Destination Address Valid?), destination manager 112 may include logic and/or features configured to validate destination addresses included in the received DMA table (e.g., via validate feature 217). In some examples, destination manager may base validity on whether a destination address falls within the secure destination address range established as mentioned above. If the destination address does not fall with the secure destination address range, the destination address is deemed as invalid and the process moves to block 550. Otherwise, the process moves to decision block 570.

Moving from decision block 540 to block 550 (Halt Crypto-DMA Operation), destination manager 112 may include logic and/or features configured to either halt the crypto-DMA operation or determine if the crypto-DMA operation has been halted. In some examples, similar to process 300, crypto-DMA module 114 may send an error signal to destination manager 112 to indicate that one or more destination addresses are invalid. For these examples, destination manager 112 determines that the crypto-DMA operation has been halted based on the error signal. In other examples, similar to process 400, destination manager 112 may halt the crypto-DMA operation based on its own determination that one or more of the destination addresses are invalid.

Proceeding from block 550 to block 560 (Send Error Indication), destination manager 112 may include logic and/or features configured to send an error indication to operating system 120 and/or application(s) 190 (e.g., via indicate feature 219). In some examples, destination manager 112 may wait a period of time for operating system 120 and/or application(s) 190 to reinitiate the crypto-DMA operation and then may either clear the valid destination range registers or remove the shared memory flag if the crypto-DMA operation is not reinitiated. The process then comes to an end.

Moving from decision block 540 to block 570 (Allow Crypto-DMA Operation to Continue), destination manager 112 may include logic and/or features configured to allow the crypto-DMA operation to continue. In some examples, crypto-DMA module 114 may now have applicable source and destination address registers set. For these examples, encrypted content obtained from source memory 140 may be decrypted by secure processor 116 and then placed by crypto-DMA module 114 in secured destination memory 150 based on the set source and destination address registers.

Continuing from block 570 to decision block 580 (Crypto-DMA Op. Complete?), destination manager 112 may include logic and/or features configured to determine if all of the encrypted content obtained from source memory 140 has been decrypted by secure processor 116 and then placed by crypto-DMA module 114 in secured destination memory 150. If all of the encrypted content has not been decrypted, the process moves back to decision block 540. Otherwise, the valid destination range registers are cleared or the shared memory flag is removed and the process comes to an end.

Figure 6:
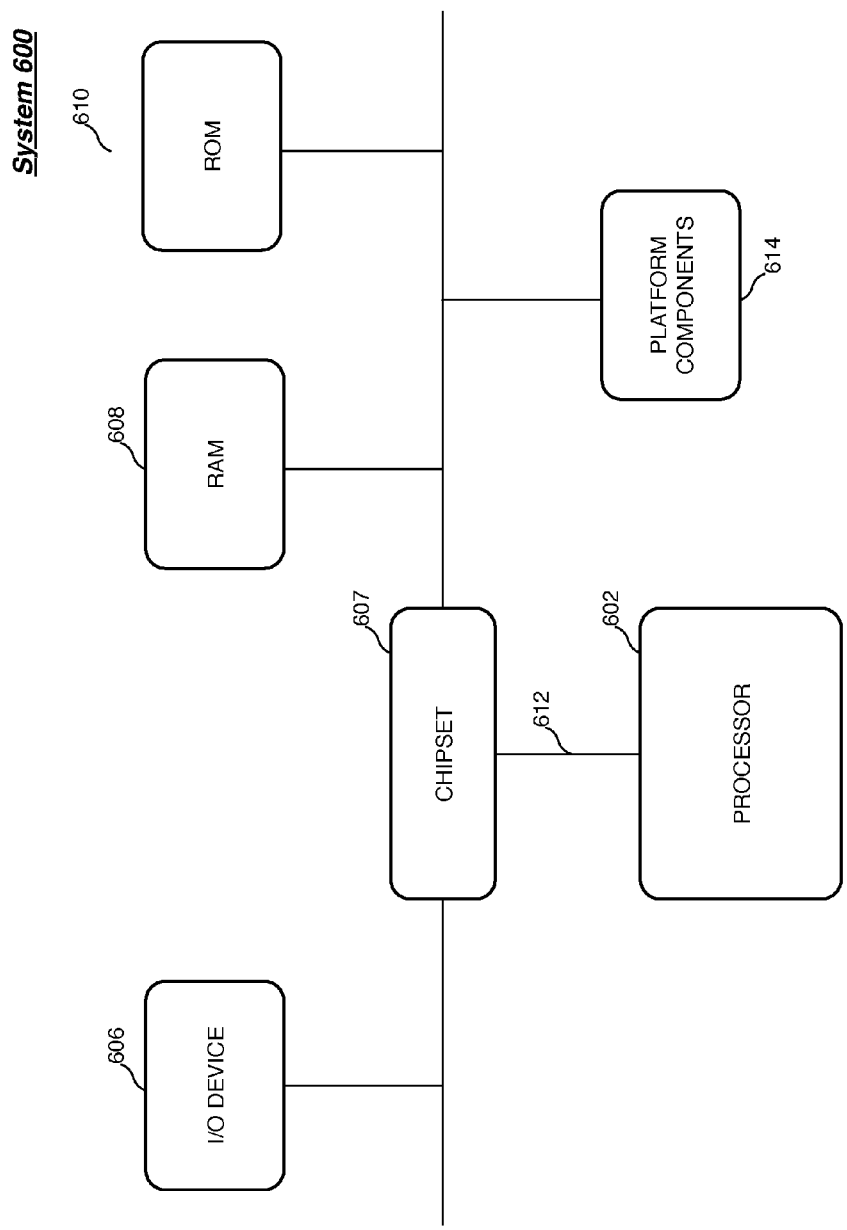
FIG. 6 illustrates an example system.

FIG. 6 is a diagram of an example system 600 for a computing device. In particular, FIG. 6 is a diagram showing a system 600, which may include various elements. For instance, FIG. 6 shows that system 600 may include a processor 602, a chipset 604, an input/output (I/O) device 606, a random access memory (RAM) (such as dynamic RAM (DRAM)) 608, and a read only memory (ROM) 610, and various platform components 614 (e.g., a fan, a cross-flow blower, a heat sink, DTM system, cooling system, housing, vents, and so forth). These elements may be implemented in hardware, software, firmware, or any combination thereof. The embodiments, however, are not limited to these elements.

As shown in FIG. 6, I/O device 606, RAM 608, and ROM 610 are coupled to processor 602 by way of chipset 604. Chipset 604 may be coupled to processor 602 by a bus 612. Accordingly, bus 612 may include multiple lines. In various examples, chipset 604 may be integrated or packaged with processor 602. Other examples are described and claimed.

Processor 602 may be a central processing unit including one or more processor cores and may have any number of processors including any number of processor cores. The processor 602 may include any type of processing unit, such as, for example, CPU, multi-processing unit, a reduced instruction set computer (RISC), a processor that have a pipeline, a complex instruction set computer (CISC), digital signal processor (DSP), and so forth.

Although not shown, the system 600 may include various interface circuits, such as an Ethernet interface and/or a Universal Serial Bus (USB) interface, and/or the like. In some exemplary embodiments, the I/O device 606 may include one or more input devices connected to interface circuits for entering data and commands into the system 600. For example, the input devices may include a keyboard, mouse, touch screen, track pad, track ball, isopoint, a voice recognition system, and/or the like. Similarly, the I/O device 606 may include one or more output devices connected to the interface circuits for outputting information to an operator. For example, the output devices may include one or more displays, printers, speakers, and/or other output devices, if desired. For example, one of the output devices may be a display. The display may be a cathode ray tube (CRTs), liquid crystal displays (LCDs), or any other type of display.

The system 600 may also have a wired or wireless network interface to exchange data with other devices via a connection to a network. The network connection may be any type of network connection, such as an Ethernet connection, digital subscriber line (DSL), telephone line, coaxial cable, etc. The network may be any type of network, such as the Internet, a telephone network, a cable network, a wireless network, a packet-switched network, a circuit-switched network, and/or the like.

Various examples may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one example may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture. An article of manufacture may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

According to some examples, an article of manufacture may include a non-transitory storage medium to store or maintain instructions that when executed by a computer or system, cause the computer or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a computer to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   logic, at least a portion of the logic implemented in hardware, the logic to:
   identify a destination address in a shared memory, the destination address associated with a memory operation;
   validate the destination address based on a secured destination address range;
   decrypt content associated with the memory operation based on validation of the destination address; and
   store the decrypted content associated with the memory operation to the destination address based on validation of the destination address.

2. The apparatus of claim 1, the secured destination address range comprising a valid destination start address and a valid destination end address.

3. The apparatus of claim 2, the logic to set the secured destination address range by storing the valid destination start address in a valid destination start address register and storing the valid destination end address in a valid destination end address register.

4. The apparatus of claim 1, the memory operation comprising a cryptographic direct memory access operation.

5. The apparatus of claim 1, the destination address comprised in a direct memory access (DMA) table.

6. The apparatus of claim 5, the logic to store the DMA table in the shared memory.

7. The apparatus of claim 1, the logic to:
   identify a second destination address in the shared memory, the second destination address associated with the memory operation;
   invalidate the second destination address based on the secured destination address range; and
   halt the memory operation based on invalidation of the second destination address.

8. The apparatus of claim 7, the logic to generate an error indication based on invalidation of the second destination address.

9. A computer-implemented method, comprising:
   identifying a destination address in a shared memory, the destination address associated with a memory operation;
   validating the destination address based on a secured destination address range;
   decrypting content associated with the memory operation based on validation of the destination address; and
   storing the decrypted content associated with the memory operation to the destination address based on validation of the destination address.

10. The computer-implemented method of claim 9, the secured destination address range comprising a valid destination start address and a valid destination end address.

11. The computer-implemented method of claim 10, comprising setting the secured destination address range by storing the valid destination start address in a valid destination start address register and storing the valid destination end address in a valid destination end address register.

12. The computer-implemented method of claim 9, the memory operation comprising a cryptographic direct memory access operation.

13. The computer-implemented method of claim 9, the destination address comprised in a direct memory access (DMA) table.

14. The computer-implemented method of claim 13, comprising storing the DMA table in the shared memory.

15. The computer-implemented method of claim 9, comprising:
   identifying a second destination address in the shared memory, the second destination address associated with the memory operation;
   invalidating the second destination address based on the secured destination address range; and
   halting the memory operation based on invalidation of the second destination address.

16. The computer-implemented method of claim 15, comprising generating an error indication based on invalidation of the second destination address.

17. An apparatus, comprising:
   logic, at least a portion of the logic implemented in hardware, the logic to:
   set a valid destination range register, a source address register, and a destination address register based on initiation of a direct memory access (DMA) operation, the valid destination range register to establish a secure destination range at a secure destination memory to place decrypted content;
   determine the DMA operation has concluded; and
   clear the valid destination range register based on conclusion of the DMA operation.

18. The apparatus of claim 17, the logic to set the valid destination range register in response to initiation of a cryptographic DMA operation.

19. The apparatus of claim 17, the logic to set the source and destination address registers based on a scatter-gather list.

20. The apparatus of claim 19, the scatter-gather list located in a shared memory.

21. A computer-implemented method, comprising:
   setting a valid destination range register, a source address register, and a destination address register based on initiation of a direct memory access (DMA) operation, the valid destination range register to establish a secure destination range at a secure destination memory to place decrypted content;
   determining the DMA operation has concluded; and
   clearing the valid destination range register based on conclusion of the DMA operation.

22. The computer-implemented method of claim 21, comprising setting the valid destination range register in response to initiation of a cryptographic DMA operation.

23. The computer-implemented method of claim 21, comprising setting the source and destination address registers based on a scatter-gather list.

24. The computer-implemented method of claim 23, the scatter-gather list located in a shared memory.

* * * * *